(12) United States Patent
Huang et al.

(10) Patent No.: US 12,318,970 B2
(45) Date of Patent: Jun. 3, 2025

(54) HIGH-EFFICIENCY MOLD TEMPERATURE CONTROL SYSTEM

(71) Applicant: PRECISION MACHINERY RESEARCH & DEVELOPMENT CENTER, Taichung (TW)

(72) Inventors: Sung-Yuan Huang, Taichung (TW); Yi-Kai Huang, Taichung (TW); Ying-Bin Wang, Taichung (TW); Ming-Ching Chou, Taichung (TW)

(73) Assignee: PRECISION MACHINERY RESEARCH & DEVELOPMENT CENTER, Taichung (TW)

( * ) Notice: Subject to any disclaimer, the term of this patent is extended or adjusted under 35 U.S.C. 154(b) by 49 days.

(21) Appl. No.: 18/504,571

(22) Filed: Nov. 8, 2023

(65) Prior Publication Data

US 2025/0144851 A1 May 8, 2025

(51) Int. Cl.
| | | |
|---|---|---|
| *B29C 35/12* | (2006.01) | |
| *B29C 33/04* | (2006.01) | |
| *B29C 33/08* | (2006.01) | |
| *F24H 1/20* | (2022.01) | |

(52) U.S. Cl.
CPC .............. *B29C 35/12* (2013.01); *B29C 33/04* (2013.01); *B29C 33/08* (2013.01); *F24H 1/203* (2013.01)

(58) Field of Classification Search
CPC .... B29C 35/12; B29C 33/04; F24H 1/18–208
See application file for complete search history.

(56) References Cited

U.S. PATENT DOCUMENTS

| | | | | |
|---|---|---|---|---|
| 6,203,731 B1 * | 3/2001 | Kato | ...................... | B29C 45/00 |
| | | | | 264/40.6 |
| 7,323,127 B2 * | 1/2008 | Muranaka | ........... | B29C 45/7306 |
| | | | | 264/40.6 |
| 7,527,756 B2 * | 5/2009 | Miyagawa | .......... | B29C 45/7306 |
| | | | | 264/327 |

FOREIGN PATENT DOCUMENTS

| | | | | |
|---|---|---|---|---|
| CN | 202037830 U | | 11/2011 | |
| CN | 109109233 A | * | 1/2019 | ............. B29C 33/04 |
| CN | 113134954 A | * | 7/2021 | ........... B29C 45/7306 |
| DE | 202008018363 U1 | * | 8/2013 | ........... B29C 35/007 |
| EP | 3081361 A1 | * | 10/2016 | ......... B29C 45/7306 |

(Continued)

*Primary Examiner* — Atul P. Khare
(74) *Attorney, Agent, or Firm* — MUNCY, GEISSLER, OLDS & LOWE, P.C.

(57) ABSTRACT

A high-efficiency mold temperature control system includes a dielectric heating module, a cooling module, and a flow control module. The dielectric heating module includes a heating circuit, a dielectric heater, a high-frequency power supply, a high-temperature heat medium storage tank, and a heat circulation pump. The cooling module includes a cooling circuit, a heat exchanger, a low-temperature heat medium storage tank, and a cold circulation pump. The flow control module includes multiple thermal switch valves and multiple cooling switch valves to control a high-temperature heat medium to the heating circuit or control a low-temperature heat medium to the cooling circuit. Through the design of the dielectric heating module, the high-temperature heat medium can be rapidly heated and the overall heating efficiency can be enhanced, thereby rapidly heating or cooling a mold and controlling the rapid heating and cooling of the mold.

6 Claims, 10 Drawing Sheets

(56) References Cited

FOREIGN PATENT DOCUMENTS

TW            M655284 U   *   5/2024   ............. B29C 45/78

* cited by examiner

HIGH-EFFICIENCY MOLD TEMPERATURE CONTROL SYSTEM

BACKGROUND OF THE INVENTION

1. Field of the Invention

The present invention relates to a high-efficiency mold temperature control system and more particularly, to a mold temperature control system that has a dielectric heating module and a cooling module to rapidly heat or cool a mold.

2. Description of the Related Art

A traditional mold temperature control machine only provides a single function of heating or cooling. With the increasing advancement of plastic processes and construction methods, the temperature control requirements of a mold become increasingly complex and precise. The traditional mold temperature control machine used for heating uses the electric heating rods to heat liquids. However, the electric heating rods are prone to generate scale deposits, thus reducing heating efficiency. In addition, the traditional mold temperature control machine used for cooling uses a compressor with refrigerant, condenser, expansion valve, evaporator and other components to cool down. In addition to being relatively expensive, the aforesaid components also tend to make the pipeline of the mold temperature control machine more complex, occupy larger space, and result in lower energy efficiency.

CN 202037830 U discloses a water-oil dual-purpose mold temperature device that includes a liquid storage tank, a media transport component, a heating component, a plate heat exchanger, a temperature measuring component, a control unit, an electromagnetic valve, a coolant inlet pipe, and a coolant outlet pipe. The aforesaid heating component uses the traditional electric heating to heat the coolant, which has a slow heating rate and consumes energy. It can be seen that the design of the existing mold temperature control machine is not perfect and there is still room for improvement.

SUMMARY OF THE INVENTION

It is one objective of the present invention to provide a high-efficiency mold temperature control system, which has an advantage of rapid heating.

To attain the above objectives, the mold temperature control system is used for heating or cooling a mold, comprising a dielectric heating module, a cooling module, and a flow control module. The dielectric heating module includes a heating circuit, a dielectric heater, a high-frequency power supply, a high-temperature heat medium storage tank, and a heat circulation pump. The heating circuit is connected with a flow channel of the mold for providing passage of a high-temperature heat medium. The dielectric heater is made of conductors and contains the high-temperature heat medium. The high-frequency power supply provides a high-frequency AC signal to the dielectric heater, such that heat is generated on the surfaces of the dielectric heater to heat the high-temperature heat medium contained in the dielectric heater. The high-temperature heat medium storage tank is connected to the heating circuit and stores the heated high-temperature heat medium. The heat circulation pump is connected to the heating circuit and drives the high-temperature heat medium to flow through the dielectric heater and the high-temperature heat medium storage tank in the heating circuit.

The cooling module includes a cooling circuit, a heat exchanger, a low-temperature heat medium storage tank, and a cold circulation pump. The cooling circuit is connected with the flow channel for providing passage of a low-temperature heat medium. The heat exchanger is connected to the cooling circuit and cools the low-temperature heat medium. The low-temperature heat medium storage tank is connected to the cooling circuit and stores the low-temperature heat medium. The cold circulation pump is connected to the cooling circuit and drives the low-temperature heat medium to flow through the heat exchanger and the low-temperature heat medium storage tank in the cooling circuit.

The flow control module includes a plurality of thermal switch valves and a plurality of cooling switch valves. The thermal switch valves are connected to the heating circuit and the flow channel and configured to be switched between a mold heating mode where the high-temperature heat medium circulates in the heating circuit and the flow channel to heat the mold, and a high-temperature heat medium self-circulation mode where the high-temperature heat medium circulates in the heating circuit without flowing through the flow channel. The cooling switch valves are connected to the cooling circuit and the flow channel and configured to be switched between a mold cooling mode where the low-temperature heat medium circulates in the cooling circuit and the flow channel to cool the mold, and a low-temperature heat medium self-circulation mode where the low-temperature heat medium circulates in the cooling circuit without flowing through the flow channel.

It can be seen from the above that through the design of the dielectric heating module, the high-temperature heat medium (such as high-temperature water used to heat the mold) can be rapidly heated to enhance overall heating efficiency. On the other hand, various modes are controlled through the thermal switch valves and cooling switch valves of the flow control module, so that when the flow control module is switched to the high-temperature heat medium self-circulation mode and the low-temperature heat medium self-circulation mode, the closed circuit is used to rapidly heat and cool the high-temperature heat medium (such as high-temperature water used to heat the mold) and the low-temperature heat medium (such as low-temperature water used to cool the mold), and when the flow control module is switched to the mold heating mode and the mold cooling mode, the low-temperature heat medium can be rapidly drawn from the low-temperature heat medium storage tank to cool the mold, or the high-temperature heat medium can be rapidly drawn from the high-temperature heat medium storage tank to heat the mold, thereby controlling rapid heating and cooling of the mold.

In one aspect, the high-temperature heat medium can be high-temperature water or high-temperature oil, and the low-temperature heat medium can be low-temperature water or low-temperature oil. However, the following embodiments are not limited thereto.

In another aspect, the dielectric heating module further comprises a matching capacitor set coupled to the high-frequency power supply, and a high-frequency transformer having a power supply end coupled to the matching capacitor set and a load end directly coupled to the dielectric heater. By using the matching capacitor set to heat the dielectric heaters of different configurations, the equivalent inductance values of the dielectric heaters of different configurations is detected first to find the resonant frequency of the entire dielectric heating module, and through the matching capacitor set, the generation of virtual work during dielectric heating is reduced and the heating efficiency is improved, thus effectively solving the past problem of mismatch between the equivalent inductance value and the capacitance value at the load end.

In another aspect, the matching capacitor set comprises an input end, an output end, and a plurality of capacitor units coupled between the input end and the output end in a parallel manner. The capacitor units each have a first switch, at least one matching capacitor, and a second switch connected in series. The dielectric heating module further comprises a computing unit electrically connected to the first and second switches of the capacitor units and controlling conduction or disconnection of the first and second switches. In this way, capacitance matching can be performed automatically, so there is no need to rely on the experience of professional technicians to determine the resonant frequency.

In another aspect, the heat exchanger comprises a heat exchange module having a plurality of heat exchange fins arranged in a spaced manner. The surface of each of the heat exchange fins is provided with a plurality of V-shaped protrusions arranged in an equally-spaced manner. The V-shaped protrusions each have a first diagonal section and a second diagonal section. The first diagonal sections are parallel to each other and the second diagonal sections are parallel to each other. Through the design of the V-shaped protrusions of the heat exchange fin, the heat exchange efficiency can be effectively enhanced.

In another aspect, the dielectric heater is also provided with a Tesla valve inside, and the high-temperature heat medium flows through the Tesla valve. Through the Tesla valve, turbulent flow is formed by the high-temperature heat medium in the Tesla valve, such that the residence time of the high-temperature heat medium inside the dielectric heater is increased, thereby enhancing heat exchange efficiency.

Other advantages and features of the present invention will be fully understood by reference to the following specification in conjunction with the accompanying drawings, in which like reference signs denote like components of structure.

DETAILED DESCRIPTION OF THE INVENTION

Figure 1:
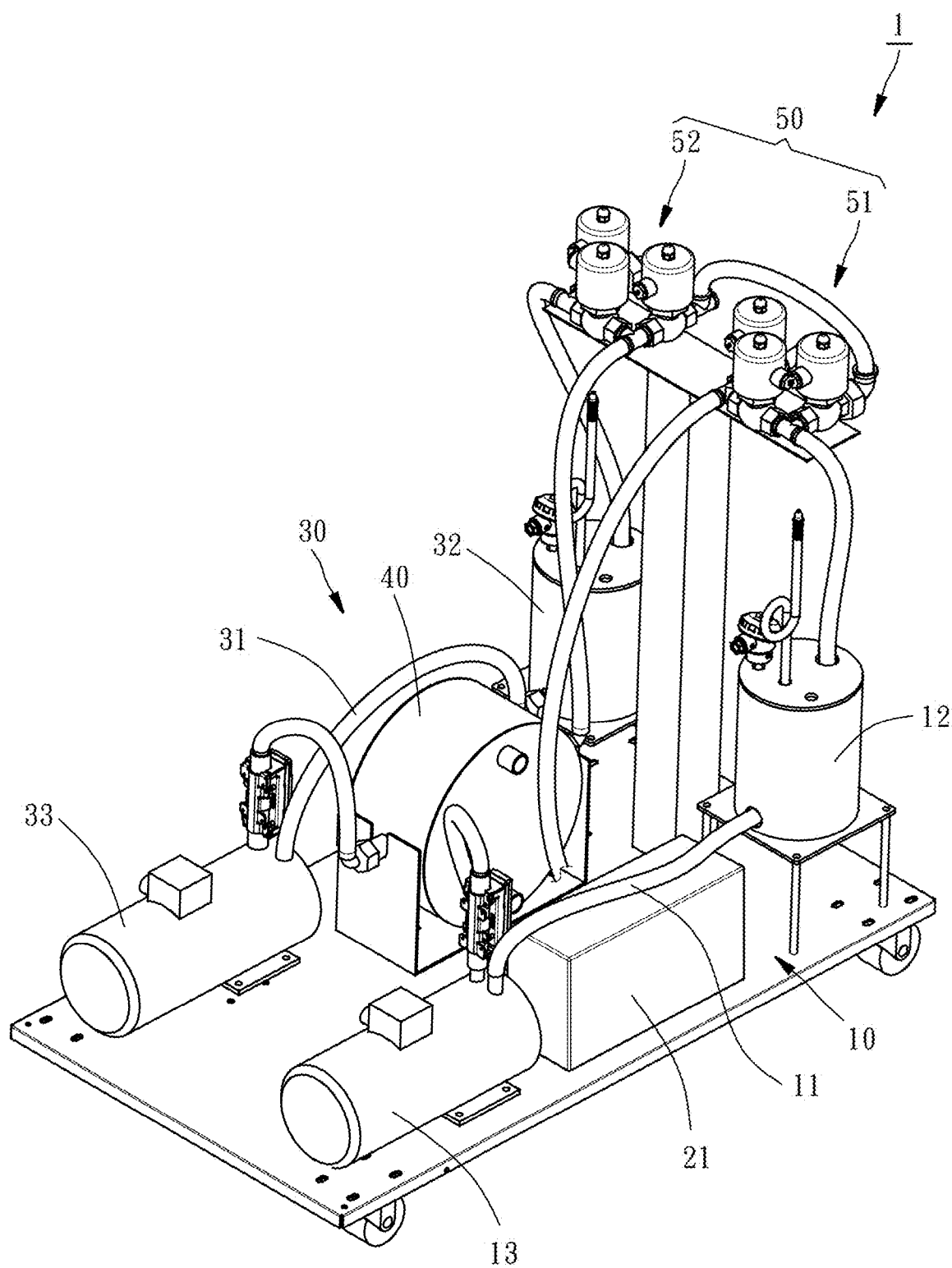
FIG. 1 is a perspective view of a mold temperature control system of the present invention.
Figure 2:
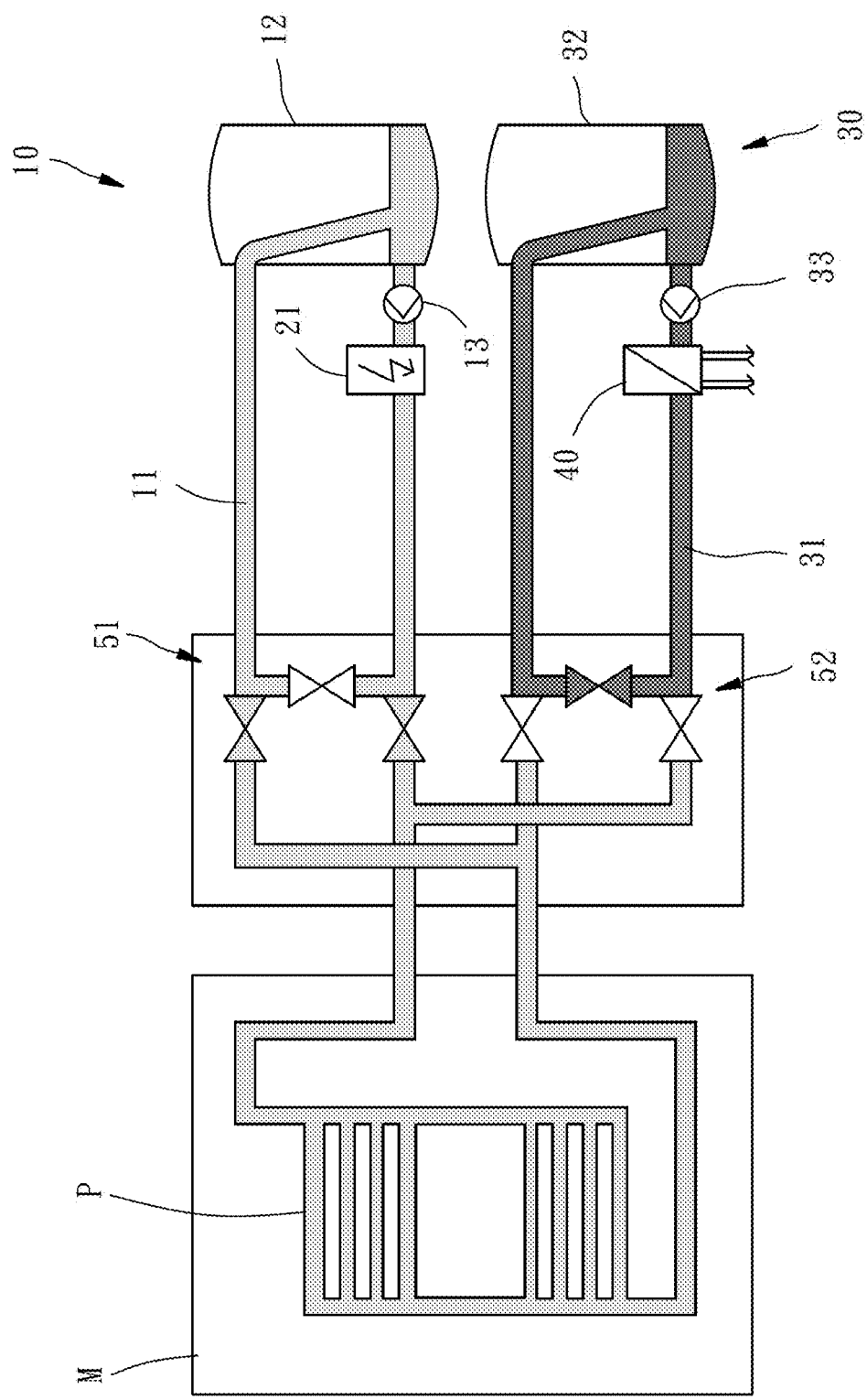
FIG. 2 is a schematic drawing of the mold temperature control system of the present invention, illustrating the situation of the mold temperature control system in the mold heating mode and the low-temperature heat medium self-circulation mode.

As shown in FIGS. 1 and 2, a mold temperature control system 1 of the present invention is used for heating or cooling a mold M. The mold M comprises a flow channel P therein for providing passage of a high-temperature heat medium or low-temperature heat medium. The high-temperature heat medium may be, for example, high-temperature water or high-temperature oil for heating the mold M. On the contrary, the low-temperature heat medium may be, for example, low-temperature water or low-temperature oil for cooling the mold M. In this embodiment, the mold M is used in an injection molding process. In some cases, the mold M can also be used in a hot pressing, extrusion or blow molding process and is not limited to this embodiment. Please refer to FIGS. 1 to 6, the mold temperature control system 1 of the present invention comprises a dielectric heating module 10, a cooling module 30, and a flow control module 50.

Figure 4:
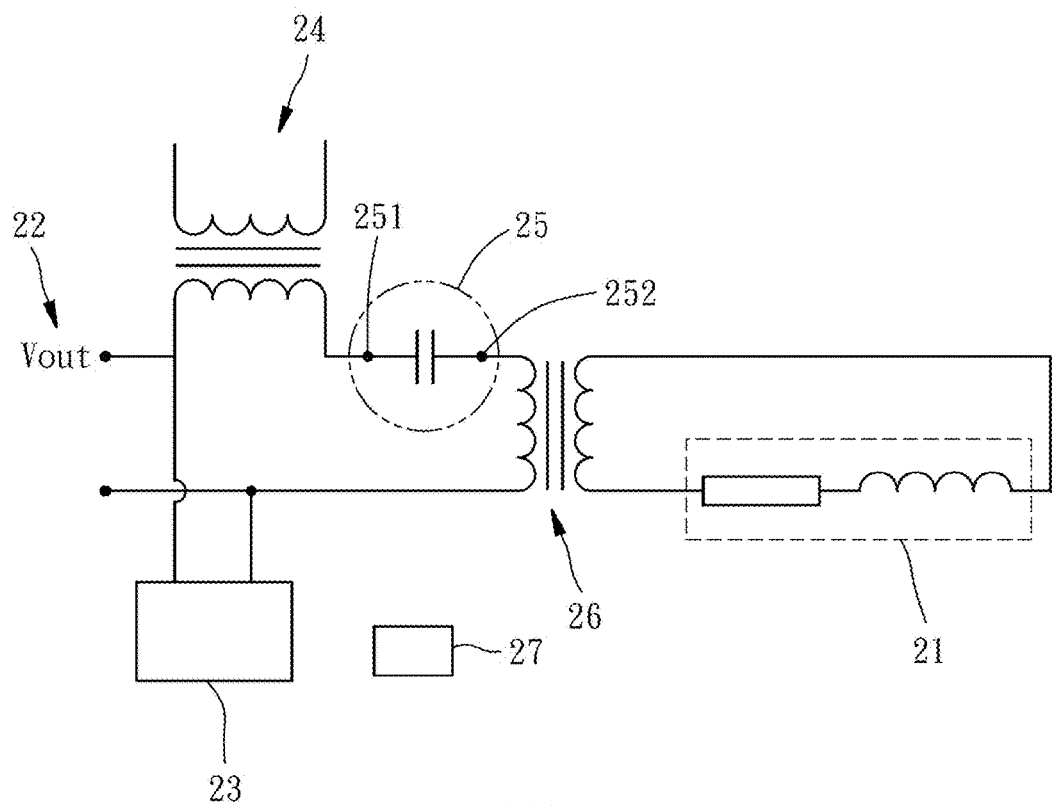
FIG. 4 is a connection diagram of the dielectric heating module provided by the mold temperature control system of the present invention.
Figure 6:
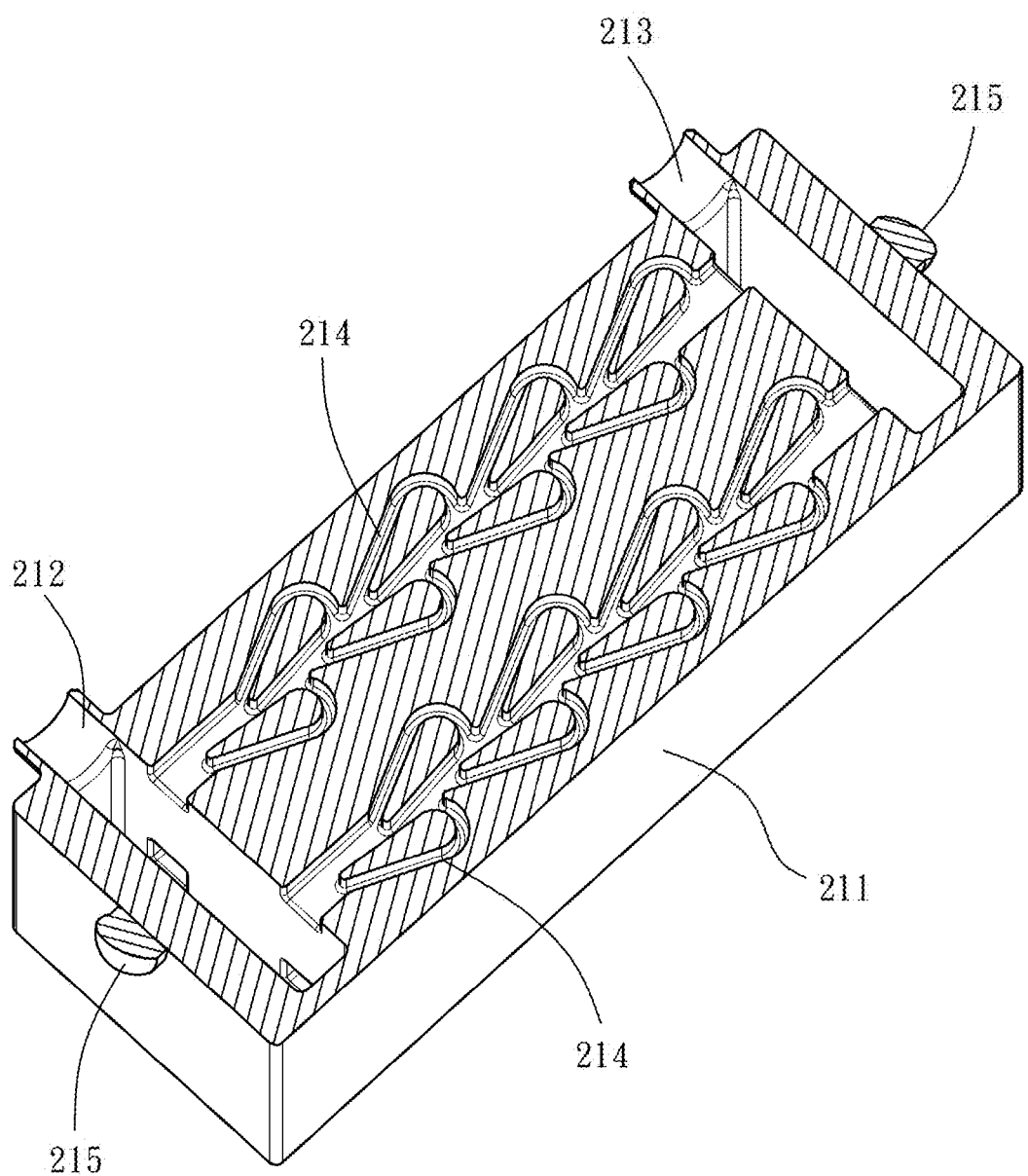
FIG. 6 is a sectional view of the dielectric heater provided by the mold temperature control system of the present invention.
Figure 7:
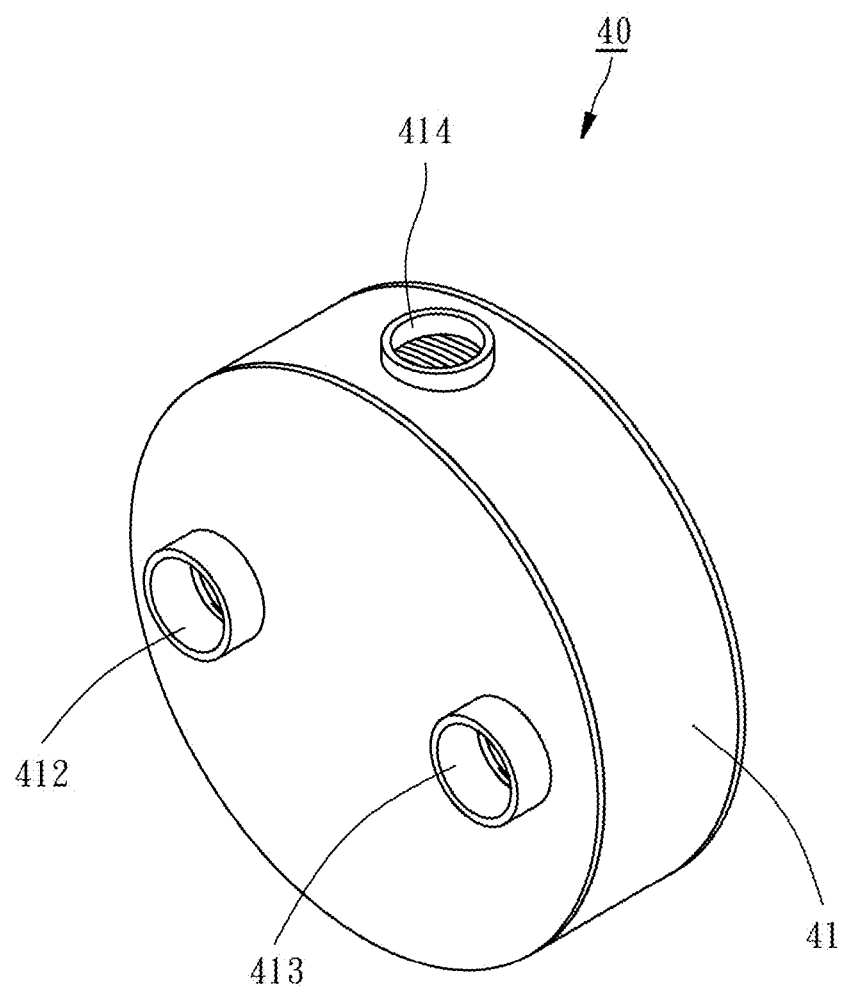
FIG. 7 is a perspective view of the cooling module provided by the mold temperature control system of the present invention.

The dielectric heating module 10 includes a heating circuit 11, a dielectric heater 21, a high-frequency power supply 22, a high-temperature heat medium storage tank 12, and a heat circulation pump 13. The heating circuit 11 is connected to the flow channel P for providing passage of the high-temperature heat medium. The dielectric heater 21 is made of conductors and contains the high-temperature heat medium. As shown in FIG. 6, the dielectric heater 21 includes a chamber body 211 provided with an inlet 212, an outlet 213, and four Tesla valves 214 communicating with the inlet 212 and the outlet 213 (FIG. 6 shows only two of the Tesla valves 214, and the other two are located below the above two Tesla valves 214). The high-temperature heat medium enters the Tesla valves 214 through the inlet 212 to generate turbulent flow in the Tesla valves 214, thereby enhancing the heat conduction efficiency between the high-temperature heat medium and the inner walls of the Tesla valves 214. The two opposite ends of the chamber body 211 are provided with electrodes 215. As shown in FIG. 4, the high-frequency power supply 22 is used to provide a high-frequency AC signal. The high-frequency power supply 22 is coupled to a voltage detection circuit 23 and a current detection circuit 24. The voltage detection circuit 23 is used to detect a voltage value of the output high-frequency AC signal. The current detection circuit 24 is used to detect a current value of the output high-frequency AC signal.

The high-frequency power supply 22 is further coupled to a matching capacitor set 25 and a high-frequency transformer 26. As shown in FIG. 4, the high-frequency transformer 26 has a power supply end and a load end (i.e., a secondary side). The power supply end of the high-frequency transformer 26 is coupled to the matching capacitor set 25. The high-frequency transformer 26 is used to reduce the voltage value of the high-frequency AC signal and increase the current value of the high-frequency AC signal, thus facilitating subsequent dielectric heating. The load end of the high-frequency transformer 26 is directly coupled to the electrodes 215 of the chamber body 211 of the dielectric heater 21, and transmits the high-frequency AC signal after modulating current to the surfaces of the chamber body 211 of the dielectric heater 21 made of the conductors, such that the skin effects are generated to rapidly generate heat on the surfaces of the chamber body 211 (especially on the inner walls of the Tesla valves 214), and the generated heat is transferred to the high-temperature heat medium contained inside the dielectric heater 21 through thermal conduction, thereby achieving an instant heating effect to facilitate subsequent rapid heating of the mold M.

Figure 5:
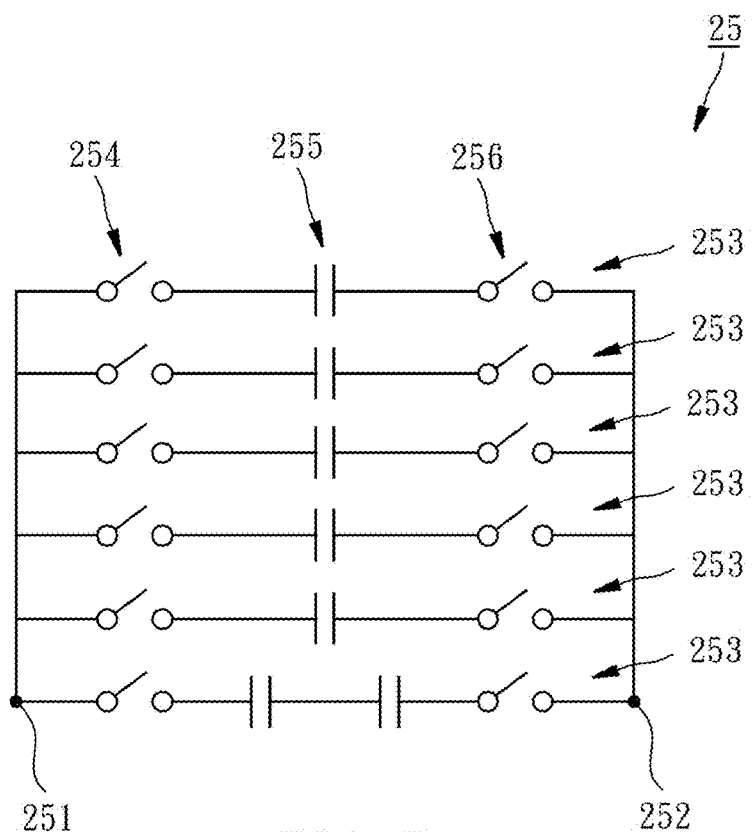
FIG. 5 is a circuit diagram of the matching capacitor set provided by the mold temperature control system of the present invention.

As shown in FIG. 5, the matching capacitor set 25 comprises an input end 251, an output end 252, and a plurality of capacitor units 253 coupled between the input end 251 and the output end 252 in a parallel manner. The input end 251 is coupled to the current detection circuit 24, and the output end 252 is coupled to the power supply end of the high-frequency transformer 26. In this embodiment, the capacitor units 253 are six in number. The number of the capacitor units 253 can be increased or decreased according to actual needs. The capacitor units 253 each have a first switch 254, at least one matching capacitor 255, and a second switch 256 connected in series. In this embodiment, the first set of the capacitor units 253 has two matching capacitors 255, and the rest set of the capacitor units 253 has only one matching capacitor 255.

Please return to FIG. 4, the dielectric heating module 10 further comprises a computing unit 27 electrically connected to the first and second switches 254, 256 of the capacitor units 253 and controlling conduction or disconnection of the first and second switches 254, 256. The computing unit 27 may be a microprocessor, a single chip, an application-specific integrated circuit chip, or other chips capable of performing general computing functions. The computing unit 27 calculates the phase difference between the current value detected by the current detection circuit 24 and the voltage value detected by the voltage detection circuit 23. After that, the computing unit 27 also considers the inductance value of the loaded dielectric heater 21 to calculate an appropriate resonant capacitance value. The computing unit 27 controls the conduction or disconnection of the first and second switches 254, 256 of the capacitor units 253 based on the phase difference, so that the equivalent capacitance value combined by the entire matching capacitor set 25 can be close to the resonant capacitance value. As such, the frequency of the AC signal after modulating subsequent output to the dielectric heater 21 can be close to the resonant frequency. This reduces virtual work caused by poor matching and enhances electrical energy conversion efficiency to more than 90%. In addition, through dielectric heating, the heating time can also be effectively shortened and the heating efficiency can be effectively increased.

Please return to FIG. 1, the high-temperature heat medium storage tank 12 is connected to the heating circuit 11 and stores the heated high-temperature heat medium. The heat circulation pump 13 is connected to the heating circuit 11 and drives the high-temperature heat medium to flow through the dielectric heater 21 and the high-temperature heat medium storage tank 12 in the heating circuit 11.

Figure 8:
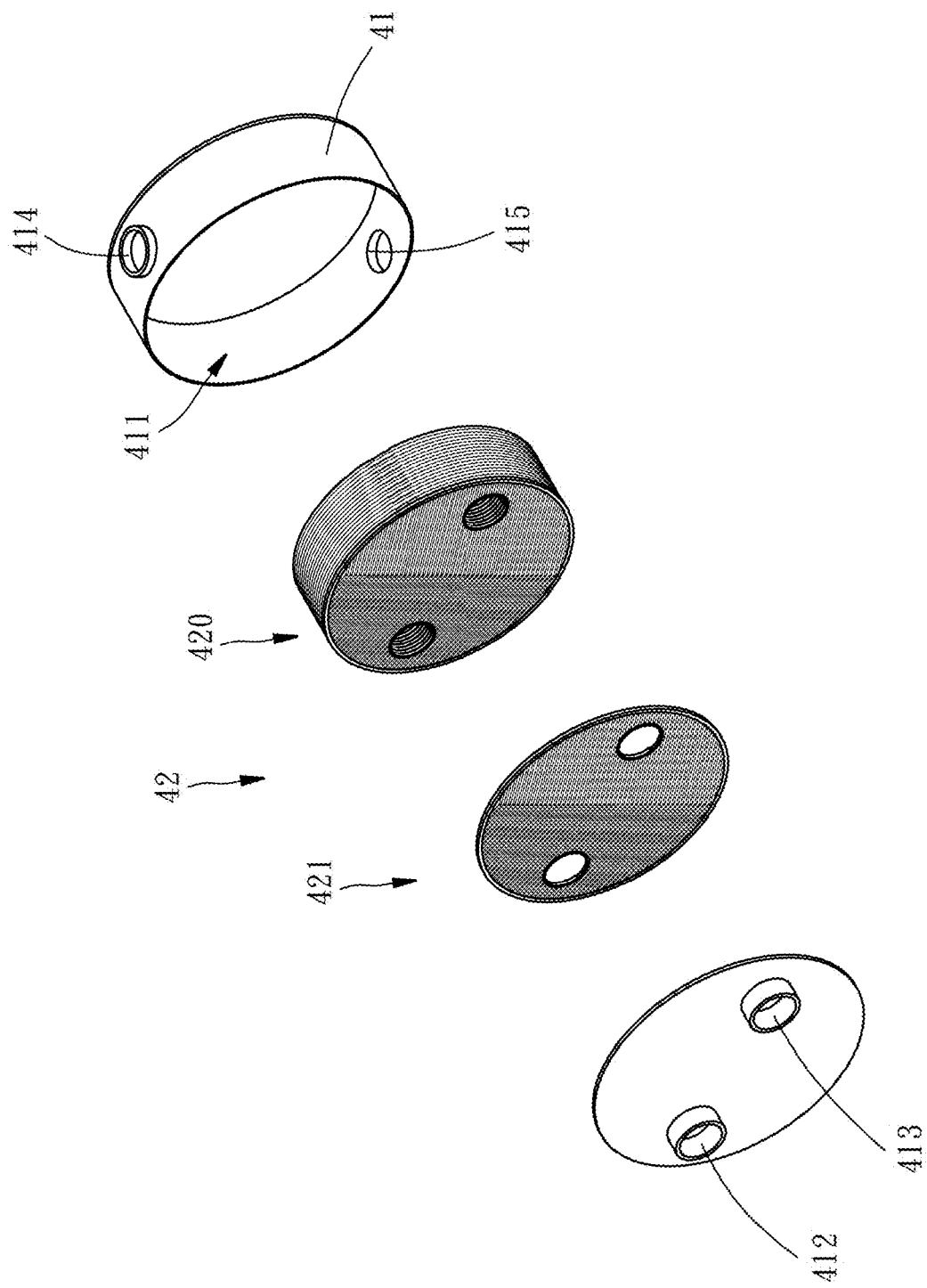
FIG. 8 is an exploded view of FIG. 7.
Figure 9:
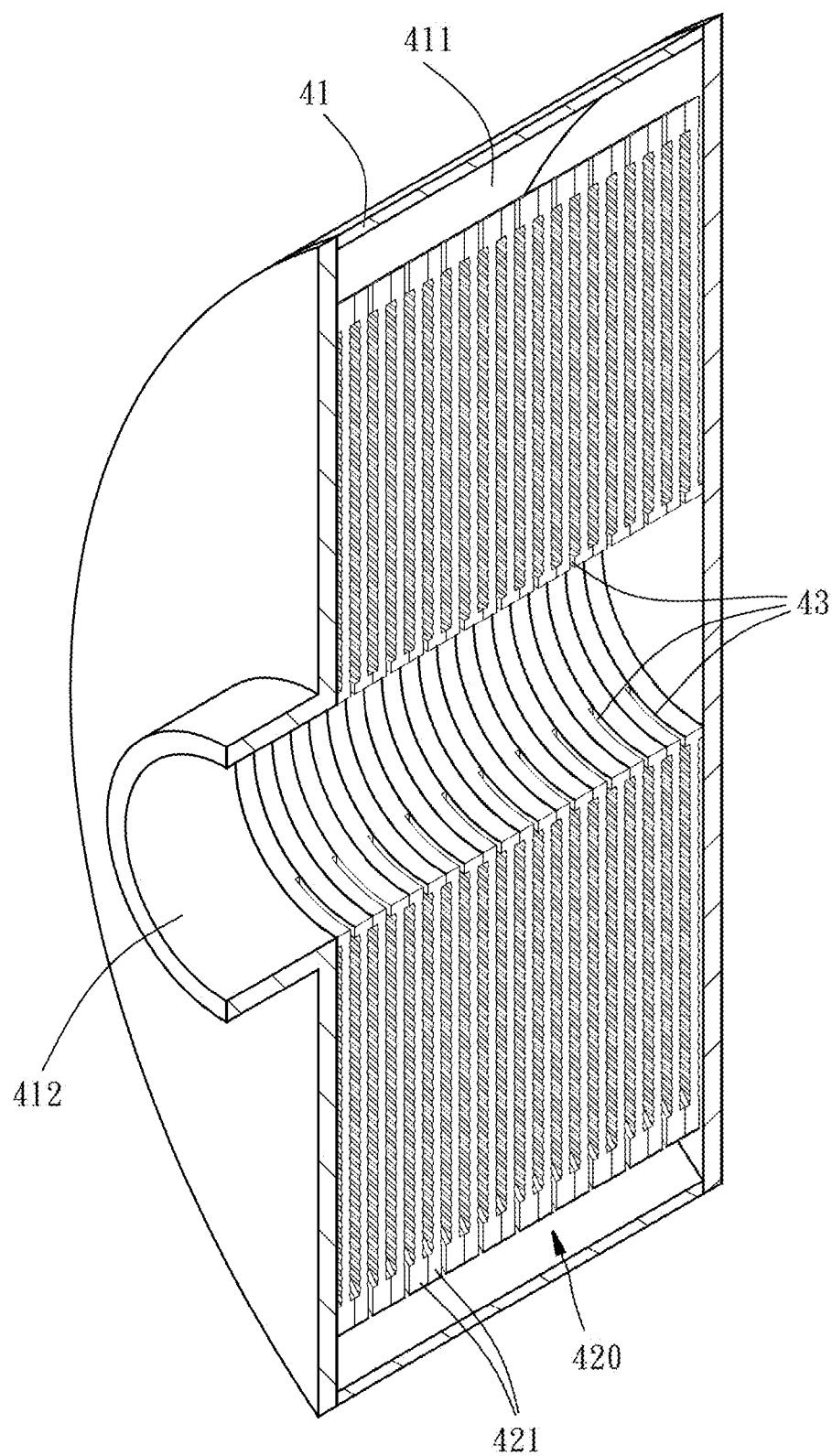
FIG. 9 is a sectional view taken along line 9-9 of FIG. 7.
Figure 10:
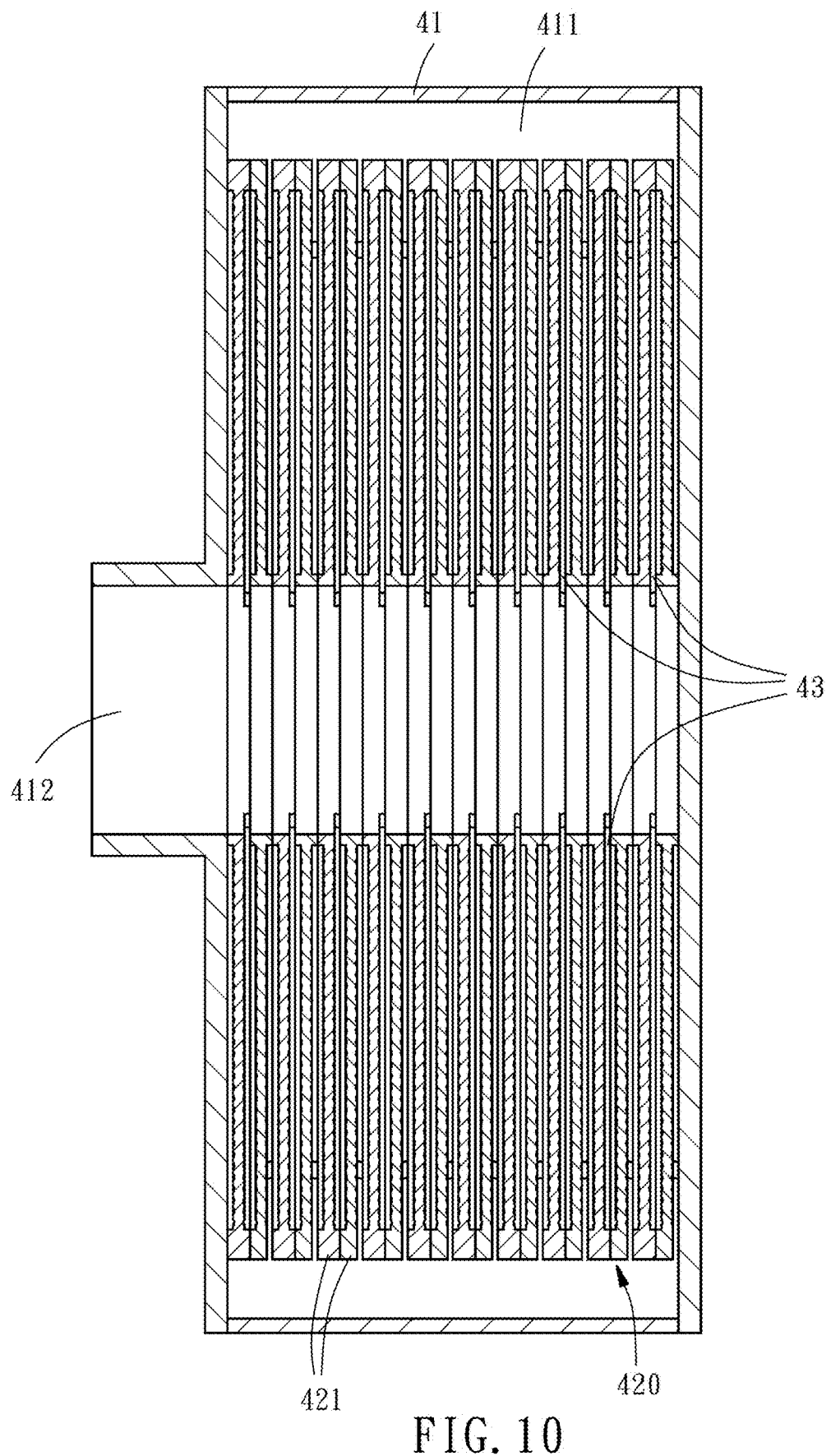
FIG. 10 is a plane view of FIG. 9.
Figure 11:
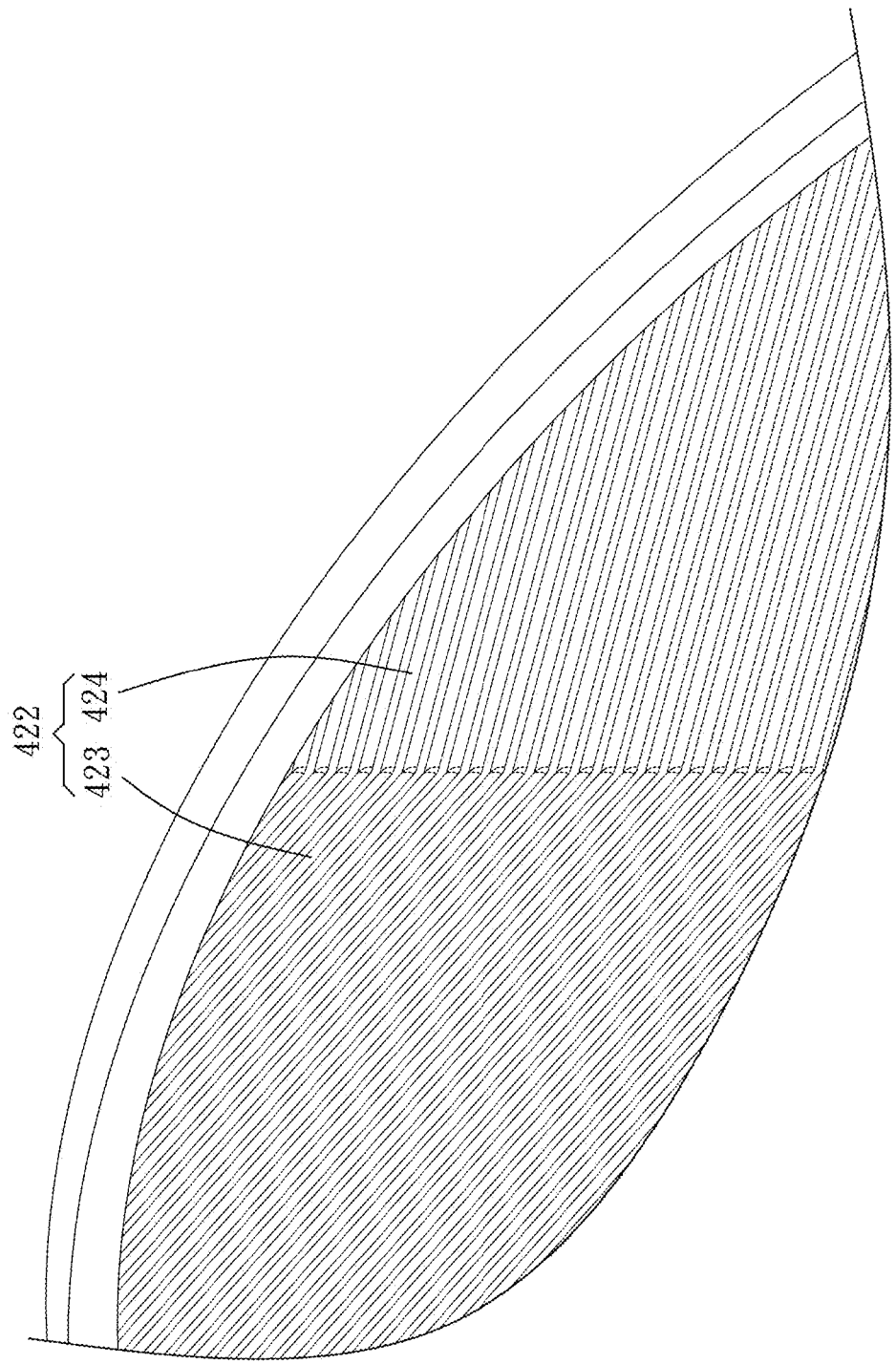
FIG. 11 is a partially enlarged view of the heat exchange fin, illustrating the V-shaped protrusion.

The cooling module 30 includes a cooling circuit 31, a heat exchanger 40, a low-temperature heat medium storage tank 32, and a cold circulation pump 33. The cooling circuit 31 is connected with the flow channel P for providing passage of the low-temperature heat medium (such as cooling water or cooling oil). The heat exchanger 40 is connected to the cooling circuit 31 and cools the low-temperature heat medium. Specifically speaking, as shown in FIGS. 7 to 11, the heat exchanger 40 comprises a housing 41, a heat exchange module 42, and a coolant flow channel 43. The housing 41 has an accommodation space 411, a coolant inlet 412 connected to the accommodation space 411, a coolant outlet 413 connected to the accommodation space 411, a low-temperature heat medium inlet 414, and a low-temperature heat medium outlet 415. As shown in FIG. 8, the low-temperature heat medium in the cooling circuit 31 flows into the accommodation space 411 of the heat exchanger 40 from the low-temperature heat medium inlet 414, and then flows through the outside of the heat exchange module 42, and finally flows out from the low-temperature heat medium outlet 415. The heat exchange module 42 is disposed in the accommodation space 411 and has a plurality of heat exchange fins 420 arranged in a spaced manner. The heat exchange fins 420 each have two fin units 421 welded to each other to form a hollow structure therebetween as a part of the coolant flow channel 43 (as shown in FIG. 9). The coolant flow channel 43 are connected to the coolant inlet 412 and the coolant outlet 413, and the coolant flow channel 43 can be connected to the factory waterway. Connecting the two fin units 421 by welding can effectively strengthen the pressure resistance of the heat exchanger 40. The outer surface of the fin unit 421 of each of the heat exchange fins 420 is provided with a plurality of V-shaped protrusions 422 arranged in an equally-spaced manner (as shown in FIG. 11). The V-shaped protrusions 422 each have a first diagonal section 423 and a second diagonal section 424. The first diagonal sections 423 are parallel to each other, and the second diagonal sections 424 are parallel to each other. Through the structural design of the V-shaped protrusions 422, the heat exchange area can be maximized, so that the low-temperature heat medium flowing through the heat exchange module 42 can be rapidly cooled, and the cooling time can also be effectively shortened.

Please return to FIG. 1, the low-temperature heat medium storage tank 32 is connected to the cooling circuit 31 and stores the low-temperature heat medium. The cold circulation pump 33 is connected to the cooling circuit 31 and drives the low-temperature heat medium to flow through the heat exchanger 40 and the low-temperature heat medium storage tank 32 in the cooling circuit 31.

Figure 3:
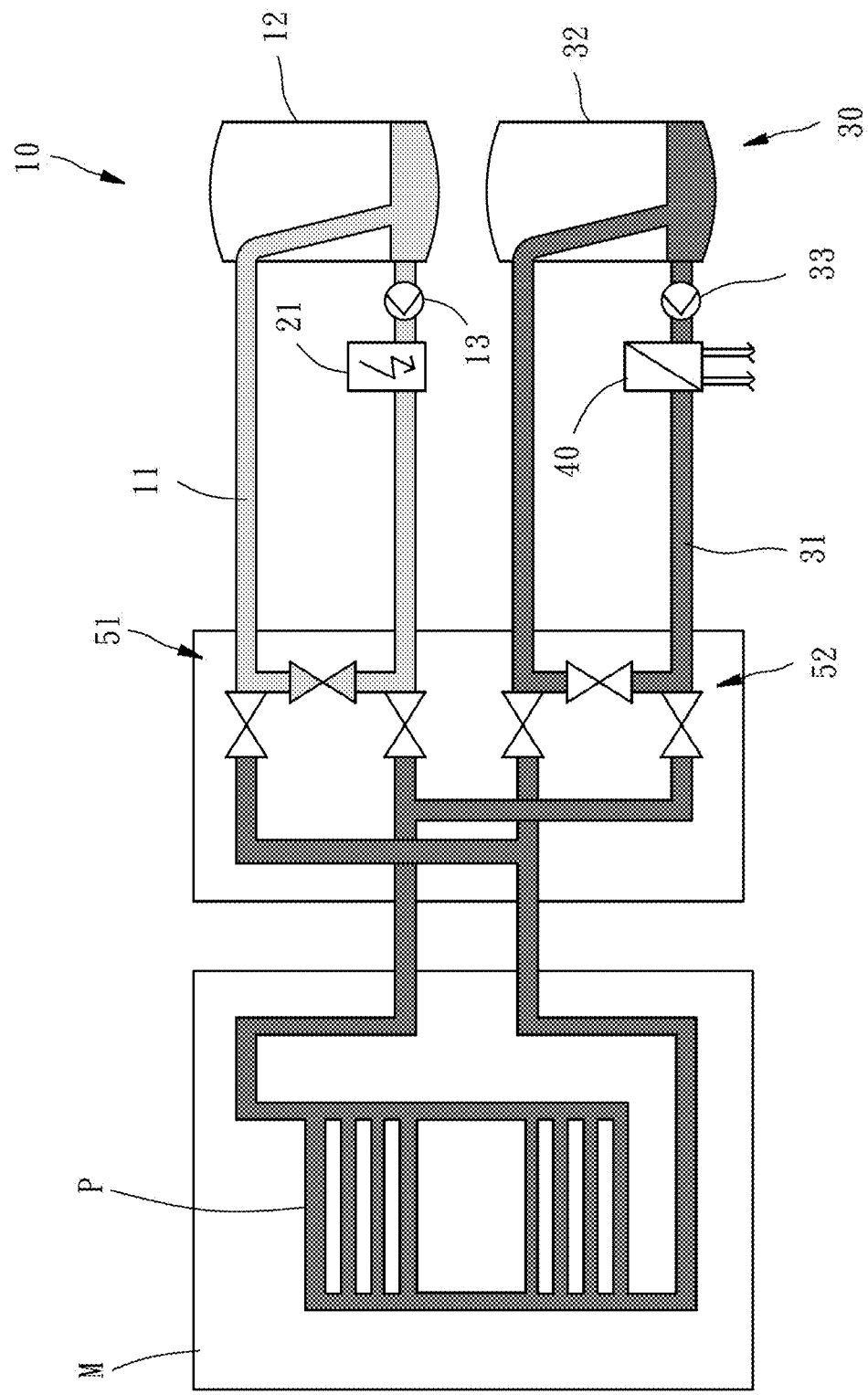
FIG. 3 is similar to FIG. 2, illustrating the situation of the mold temperature control system in the mold cooling mode and the high-temperature heat medium self-circulation mode.

As shown in FIGS. 1 to 3, the flow control module 50 includes a plurality of thermal switch valves 51 and a plurality of cooling switch valves 52. The thermal switch valves 51 are connected to the heating circuit 11 and the flow channel P, and configured to be switched between a mold heating mode and a high-temperature heat medium self-circulation mode. When the thermal switch valve 51 is switched to the mold heating mode (as shown in FIG. 2), the heat circulation pump 13 drives the high-temperature heat medium stored in the high-temperature heat medium storage tank 12 to the flow channel P, thereby heating the mold M and circulating the high-temperature heat medium in the heating circuit 11. On the contrary, when the thermal switch valve 51 is switched to the high-temperature heat medium self-circulation mode (as shown in FIG. 3), the high-temperature heat medium does not flow through the flow channel P, and the heat circulation pump 13 only drives the high-temperature heat medium to circulate in the heating circuit 11, so that the high-temperature heat medium can be rapidly heated up when flowing through the dielectric heater 21.

On the other hand, the cooling switch valves 52 are connected to the cooling circuit 31 and the flow channel P, and configured to be switched between a mold cooling mode and a low-temperature heat medium self-circulation mode. When the cooling switch valve 52 is switched to the mold cooling mode (as shown in FIG. 3), the cold circulation pump 33 drives the low-temperature heat medium stored in the low-temperature heat medium storage tank 32 to the flow channel P, thereby cooling the mold M and circulating the low-temperature heat medium in the cooling circuit 31. On the contrary, when the cooling switch valve 51 is switched to the low-temperature heat medium self-circulation mode (as shown in FIG. 2), the low-temperature heat medium does not flow through the flow channel P, and the cold circulation pump 31 only drives the low-temperature heat medium to circulate in the cooling circuit 31, so that the low-temperature heat medium can be rapidly cooled down when flowing through the heat exchanger 40.

It can be seen from the above that through the design of the dielectric heating module 10, the high-temperature heat medium can be rapidly heated to enhance overall heating efficiency. On the other hand, various modes are controlled through the thermal switch valves 51 and the cooling switch valves 52 of the flow control module 50, so that when the flow control module 50 is switched to the high-temperature heat medium self-circulation mode and the low-temperature heat medium self-circulation mode, the closed circuit is used to rapidly heat and cool the high-temperature heat medium and the low-temperature heat medium, and when the flow control module 50 is switched to the mold heating mode and the mold cooling mode, the low-temperature heat medium can be rapidly drawn from the low-temperature heat medium storage tank 32 to cool the mold M, or the high-temperature heat medium can be rapidly drawn from the high-temperature heat medium storage tank 12 to heat the mold M, thereby controlling rapid heating and cooling of the mold M. This allows the mold M to rapidly reach the temperature required for the process so as to increase production capacity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mold temperature control system for heating or cooling a mold comprising a flow channel therein, the mold temperature control system comprising:
    a dielectric heating module including:
        a heating circuit for connecting with the flow channel, the heating circuit providing passage of a high-temperature heat medium;
        a dielectric heater made of conductors and containing the high-temperature heat medium;
        a high-frequency power supply providing a high-frequency AC signal to the dielectric heater, such that heat is generated on surfaces of the dielectric heater to heat the high-temperature heat medium contained in the dielectric heater;
        a high-temperature heat medium storage tank connected to the heating circuit and storing the heated high-temperature heat medium; and
        a heat circulation pump connected to the heating circuit and driving the high-temperature heat medium to flow through the dielectric heater and the high-temperature heat medium storage tank in the heating circuit;
    a cooling module including:
        a cooling circuit for connecting with the flow channel, the cooling circuit providing passage of a low-temperature heat medium; and
        a heat exchanger connected to the cooling circuit and cooling the low-temperature heat medium;
        a low-temperature heat medium storage tank connected to the cooling circuit and storing the low-temperature heat medium;
        a cold circulation pump connected to the cooling circuit and driving the low-temperature heat medium to flow through the heat exchanger and the low-temperature heat medium storage tank in the cooling circuit; and
    a flow control module including a plurality of thermal switch valves connected to the heating circuit and the flow channel, and configured to be switched between a mold heating mode where the high-temperature heat medium circulates in the heating circuit and the flow channel to heat the mold and a high-temperature heat medium self-circulation mode where the high-temperature heat medium circulates in the heating circuit without flowing through the flow channel, and a plurality of cooling switch valves connected to the cooling circuit and the flow channel, and configured to be switched between a mold cooling mode where the low-temperature heat medium circulates in the cooling circuit and the flow channel to cool the mold and a low-temperature heat medium self-circulation mode where the low-temperature heat medium circulates in the cooling circuit without flowing through the flow channel.

2. The mold temperature control system as claimed in claim 1, wherein the dielectric heating module further comprises a matching capacitor set coupled to the high-frequency power supply, and a high-frequency transformer having a power supply end coupled to the matching capacitor set and a load end directly coupled to the dielectric heater.

3. The mold temperature control system as claimed in claim 2, wherein the matching capacitor set comprises an input end, an output end, and a plurality of capacitor units coupled between the input end and the output end in a parallel manner; the capacitor units each have a first switch, at least one matching capacitor, and a second switch connected in series; and the dielectric heating module further comprises a computing unit electrically connected to the first and second switches of the capacitor units and controlling conduction or disconnection of the first and second switches.

4. The mold temperature control system as claimed in claim 3, wherein the dielectric heating module further comprises a voltage detection circuit coupled to the high-frequency power supply and detecting a voltage value of the high-frequency AC signal, and a circuit detection circuit coupled to the high-frequency power supply and detecting a current value of the high-frequency AC signal; and the computing unit calculates a phase difference based on the voltage value and the current value and controls conduction or disconnection of the first and second switches based on a magnitude of the phase difference, thereby selecting a capacitance value that meets a resonant frequency.

5. The mold temperature control system as claimed in claim 1, wherein the heat exchanger comprises a housing having an accommodation space, a coolant inlet communicating with the accommodation space, a coolant outlet communicating with the accommodation space, a low-temperature heat medium inlet and a low-temperature heat medium outlet, a heat exchange module disposed in the accommodation space and having a plurality of heat exchange fins arranged in a spaced manner, and a coolant flow channel provided in the heat exchange fins and communicating with the coolant inlet and the coolant outlet, wherein a surface of each of the heat exchange fins is provided with a plurality of V-shaped protrusions arranged in an equally-spaced manner and each having a first diagonal section and a second diagonal section; and the first diagonal sections are parallel to each other and the second diagonal sections are parallel to each other.

6. The mold temperature control system as claimed in claim 1, wherein the high-temperature heat medium flows through a Tesla valve provided in the dielectric heater.

* * * * *